(12) United States Patent
Condra (10) Patent No.: US 12,173,525 B2
(45) Date of Patent: Dec. 24, 2024

(54) APIARY SHELTER WITH CONFIGURABLE FLIGHT PATH

(71) Applicant: Claire Condra, Lemon Grove, CA (US)

(72) Inventor: Claire Condra, Lemon Grove, CA (US)

(73) Assignee: Claire Condra, Lemon Grove, CA (US)

( * ) Notice: Subject to any disclaimer, the term of this patent is extended or adjusted under 35 U.S.C. 154(b) by 15 days.

(21) Appl. No.: 17/653,647

(22) Filed: Mar. 5, 2022

(65) Prior Publication Data
US 2023/0279686 A1    Sep. 7, 2023

(51) Int. Cl.
*E04H 5/08* (2006.01)
*A01K 55/00* (2006.01)

(52) U.S. Cl.
CPC .............. *E04H 5/08* (2013.01); *A01K 55/00* (2013.01)

(58) Field of Classification Search
CPC ........ A01K 47/00; A01K 47/02; A01K 47/04; A01K 47/06; A01K 51/00; A01K 55/00; E04H 5/08
See application file for complete search history.

(56) References Cited

U.S. PATENT DOCUMENTS

| | | | | |
|---|---|---|---|---|
| 1,981,419 A * | 11/1934 | Kreutzer | ................... | E04H 5/08 52/783.11 |
| 2,185,532 A * | 1/1940 | Waterman | ................. | E04H 5/08 454/365 |
| 2,613,640 A * | 10/1952 | Cameron | ................... | E04H 5/08 119/449 |
| 4,067,346 A * | 1/1978 | Husted | ................... | E04H 15/001 135/153 |
| 4,231,289 A * | 11/1980 | Domicent | ............... | B05B 16/40 454/52 |
| 5,033,243 A * | 7/1991 | Worms | ................. | A01K 67/033 52/80.1 |
| 7,040,335 B1 * | 5/2006 | Ransom | ................ | E04H 15/001 135/117 |
| 7,740,022 B2 * | 6/2010 | Li | ........................... | E04H 15/44 135/117 |
| 8,640,395 B2 * | 2/2014 | DiSabantonio, III | ... | E04C 2/322 52/79.5 |
| 10,584,511 B1 * | 3/2020 | Slaughter | .............. | E04H 15/001 |
| 2019/0208737 A1 * | 7/2019 | Raml | .................. | E04B 1/34336 |
| 2019/0323253 A1 * | 10/2019 | Benvie | ..................... | A01G 9/24 |
| 2020/0315143 A1 * | 10/2020 | Radzyner | ............... | A01K 53/00 |

* cited by examiner

*Primary Examiner* — Beth A Stephan (57) ABSTRACT

A form-fitting cover that when placed over a supporting frame, can be used as an enclosed apiary. A configurable opening at the top directs the flight path of the bees up and away from outdoor living spaces and nearby homes.

5 Claims, 11 Drawing Sheets

APIARY SHELTER WITH CONFIGURABLE FLIGHT PATH

FIELD

This disclosure is related to keeping bees in residential areas.

BACKGROUND

Many local jurisdictions encourage backyard beekeeping because of our reliance on honey bees (Apis mellifera) to pollinate crops and gardens. Typical local zoning requirements allow residents to keep up to two beehives placed a specific distance from property lines and neighboring homes and surrounded by a six-foot flyover barrier that is in addition to any fence, wall, or hedge already on the property line. Additional beehives might be permitted depending on the size of the property.

Most backyard beekeepers have limited space and out of necessity place their beehives near outdoor living spaces such as vegetable gardens, sheds, patios, and lawns. Beehives are usually out in the open where bees fly freely around the area. A newly installed colony might start with 2,000-3,000 bees and grow over time to five, or even ten times that size.

During their brief lifetime, most bees fulfill several different roles in succession, depending on the needs of the colony. The youngest worker bees stay inside the hive to nurse the young, tend to the queen, clean house, and build comb. Forager bees make up about 30% of the colony and are the older workers that we see in the garden.

Honey bees are fastidious and relieve themselves outside the hive. The tiny golden spots that are so hard to clean off your car were deposited by bees on "cleansing" flights.

On warm days, young bees conduct "orientation" flights around the hive to become familiar with the area. Orientation flights are sometimes mistaken for swarms because of the energetic and chaotic way the bees fly around the immediate area. Although orientation flights are a sign of a healthy colony, they might cause concern for the uninitiated and interfere with the normal outdoor activities of people who share the same space.

In an urban setting, small mammals such as mice, skunks, raccoons, and opossums are known to invade beehives. Wasps and hornets prey on bees and their larvae, while ants and bees from other colonies might rob the colony of its honey. Guard bees protect the hive entrance and become more active as the colony grows. Depending on the perceived threat, a strong colony of bees might have from ten to twenty guard bees that patrol the hive entrance.

Beekeepers enjoy a synergistic relationship with their honey bees and employ various methods to protect them from predators and robbers, such as raising the beehive off the ground and wrapping a strap around the roof and body of the hive. The surplus honey and comb that is harvested after the bees have filled their reserve stores is a bonus for the beekeeper, as are the enjoyment and satisfaction that come from this most interesting and rewarding activity.

Solution to Problem

The apiary enclosure is a form-fitting cover that when placed over a supporting frame, can be used as an enclosed apiary. A configurable opening at the top directs the bees' flight path up and away from outdoor living spaces and nearby homes.

The apiary enclosure creates an expanded safe zone for the bees and reduces events that trigger defensive behavior. It prevents children and pets from coming into direct contact with the hives, and prevents common urban predators (such as skunks, opossum, and raccoons) and robbers (of the insect variety) from gaining easy access to the hive.

BRIEF DESCRIPTION OF DRAWINGS

The following line drawings are included in the description and depict the completed apiary enclosure and the assembly process.

FIG. 1 Apiary enclosure front view
FIG. 2 Apiary enclosure wireframe
FIGS. 3-5 Aerial view of flight portal configurations
FIG. 6 Flight portal cover
FIG. 7 Entrance with front panel-left tie
FIG. 8 Pattern pieces
FIGS. 9-10 Top assembly
FIG. 11 Top and wall alignment
FIG. 12 Entrance with tie backs and fasteners
FIG. 13 Reinforced corners on front panel
FIG. 14 Completed enclosure
FIG. 15 Observation window placement (Embodiment 3)

DESCRIPTION OF EMBODIMENTS

Embodiment 1

The first and preferred embodiment of the apiary enclosure is made to fit the classic six-foot-wide model of the "Harrogate Arbour" from Agriframes Ltd.

Embodiment 2

The second embodiment is an apiary enclosure for any other supporting frame that satisfies the six-foot flyover-barrier requirement and is large enough to accommodate at least two beehives. Although a custom pattern must be made to fit the frame, the features and assembly method are essentially the same.

Embodiment 3

The third embodiment has observation windows on each side that can be used to observe the hive entrance and landing board. Each window has a fold-down flap that protects the vinyl from exposure to the elements. The observation windows can be added to the apiary enclosures described in embodiments 1 and 2.

Description of Preferred Embodiment

The garden structure that is used as the supporting frame for Embodiment 1 of the apiary enclosure is the "Harrogate Arbour," manufactured by Agriframes Ltd. in the United Kingdom. The same structure is available as the "Harrogate Bower" from Garden Artisans LLC in the United States.

The classic six-foot-wide model of this garden structure is used for the preferred embodiment because of its size, shape, and quality. It exceeds the six-foot flyover-barrier height requirement and is wide enough to accommodate two hives.

The upper walls and top of the apiary enclosure are made of recyclable agricultural netting that exposes bees to diffused sunlight.

The lower walls of the apiary enclosure are made of recyclable, breathable, heavy shade cloth.

The flight portal at the top of the apiary enclosure can be partially covered to direct the flight path of the bees to the right or left, or left uncovered to give them full access when entering and exiting the apiary enclosure. The flight portal cover is attached to the flight portal with military-grade hook and loop.

The front panel is attached to the apiary enclosure with military-grade hook and loop and reinforced with twist-turn fasteners.

Frame Dimensions
  Width: 6' (front); 5' (back)
  Height: 7' 2"
  Depth: 3' 3"

DETAILED DESCRIPTION

This detailed description includes the following use cases:
Beekeeper
Fabricator Beekeeper Use Case This section describes the setup process and use of the enclosed apiary by a backyard beekeeper.

Components

The enclosed apiary consists of the following components:
  Apiary enclosure
  Supporting frame
  Wire mesh reinforcement (recommended for lower walls 330 and ground)
  Front gates (optional)

Recommended Tools

The following tools are used to set up the enclosed apiary:
  Ladder
  Rubber mallet
  Wire cutters
  Level Optional Supplies The following supplies are optional:
  Weed cloth
  Wire mesh (½-inch chicken wire or ¼-inch hardware cloth)
  Garden staples
  Tent stakes
  Pea gravel or wood chips
  Masking tape
  Zip ties Setup Instructions The following instructions explain how to prepare the site and set up the enclosed apiary.

Step 1: Prepare the Site

Follow these steps to prepare the site:
1. Determine the best location and orientation for your apiary to meet local requirements and to direct bees away from nearby homes, parked cars, and outdoor living spaces.
2. Level the ground as much as possible.
3. Cover the area with weed cloth, extending one foot beyond the footprint of the supporting frame on all sides (approximately 8 feet by 5½ feet).
4. Follow the manufacturer's instructions to assemble the supporting frame.

Step 2: Line with Wire Mesh (Recommended)

For additional security from predators, line the lower walls 330 and ground inside the frame with either ½-inch chicken wire or ¼-inch hardware cloth. Chicken wire is more flexible and easier to work with, but hardware cloth makes a more effective barrier. The term "wire mesh" is used in the following instructions to refer to the material of your choice.

1. Use wire cutters to cut a single piece of wire mesh 12½ feet long×48 inches wide. Along the upper and lower edges of the wire mesh, measure 45 inches from each end and mark with masking tape. At the lower edge of the wire mesh, cut an 18-inch slit at each marked location.
2. Loosely fold up the lower 18 inches of wire mesh. Then, wrap the wire mesh around the lower inside wall of the frame.
3. Use zip ties to attach the wire mesh along the horizontal beam that run 30 inches from the ground around the frame. At each front post, fold the edge of the wire mesh toward the outside so the rough edge will not be exposed from inside the apiary. Then, zip-tie the wire mesh to the front posts at the horizontal beam and every few inches to the bottom of the post.
4. Rotate the ends of each zip tie to the inside of the frame and trim so they will not snag when the apiary enclosure is pulled over the frame.
5. Inside the frame, spread out the excess wire mesh where the wall meets the ground to protect the perimeter.
6. Cut an additional piece of wire mesh (6 feet×3 feet, 3 inches) to cover the ground from the entrance to the back wall.
7. Secure the wire mesh with ground staples and flatten with a mallet.
8. Cover the ground inside the frame and around the perimeter with pea gravel or wood chips.

Step 3: Place the Apiary Enclosure Over the Supporting Frame

Follow these steps to place the apiary enclosure over, and attach it to the supporting frame. It is recommended to have two people available to complete this step, as follows:
  Person (A) climbs the ladder and attaches the enclosure to the frame.
  Person (B) hands up the material and adjusts the enclosure.

1. Unfold the apiary enclosure. Remove the front panel 110 and set aside.
2. Find the anchor strap 120 behind the front arch 310 that marks the center front. Roll up the enclosure from the bottom hem 190 to the anchor strap 120 to make it manageable.
3. Person (A): Climb the ladder at the center front of the frame.
4. Person (B): Lean the rolled-up enclosure against the side of the frame (with the free edge 170 toward the front and the anchor strap 120 on the inside). Then, slide the roll up toward the top of the frame.
5. Person (A): Place the rolled-up enclosure across the top of the frame and attach the anchor strap 120 to the frame at the top of the arch. Push the rest of the rolled-up enclosure toward the back of the frame to loosely unfurl the fabric. Then, pull down the front arch 310 to fit over the front of the frame.
6. Person (B): Pull down the sides of the enclosure and adjust as needed. The seams of the enclosure line up with the frame.
7. Move the ladder inside the frame and adjust the top into position. Then starting at the rear wall and working toward the front on each side, attach the anchor straps 120 to the frame.

Figure 3:
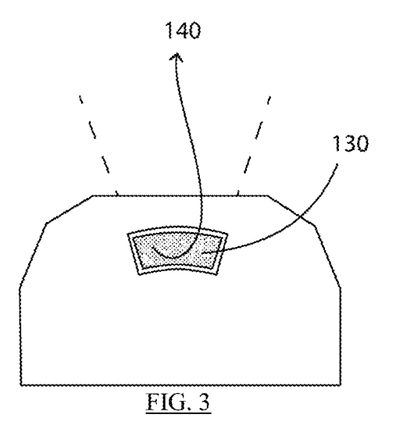
Figure 4:
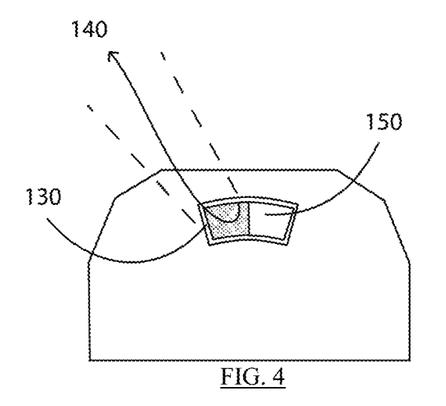
Figure 5:
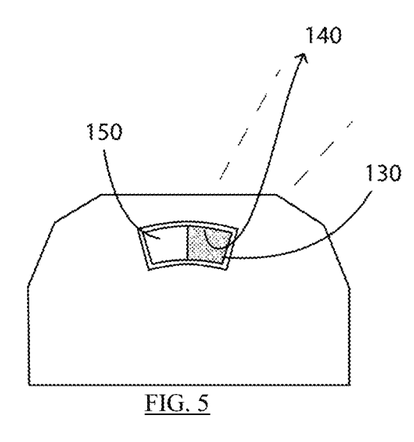
Figure 6:
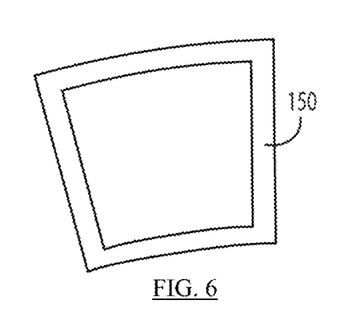

8. As shown in FIGS. 3-5, from the inside of the apiary enclosure, adjust the flight portal cover 150 to the right or left as needed. To give the bees full access from the center, remove the flight portal cover 150 and leave the full width of the flight portal 130 open.
9. Align the hook and loop 160 that runs up each side of the entrance 100 with the frame. Make sure that the bottom edge of the front arch is straight.
10. Wrap the free edge 170 around the frame on each side of the entrance 100 and snap in place. If you installed wire mesh, you might need to clip it with wire cutters to make room for the snaps 270.
11. Use zip ties as needed to line up the seams with the frame and to secure the apiary enclosure to the frame. The apiary enclosure should fit without sagging.
12. Pound garden staples or tent stakes into the grommets 180 along the bottom hem 190 to anchor the apiary enclosure to the ground. The hem is long enough to overlap the ground and to accommodate slight differences in elevation.

Step 4: Attach Front Panel

Figure 7:
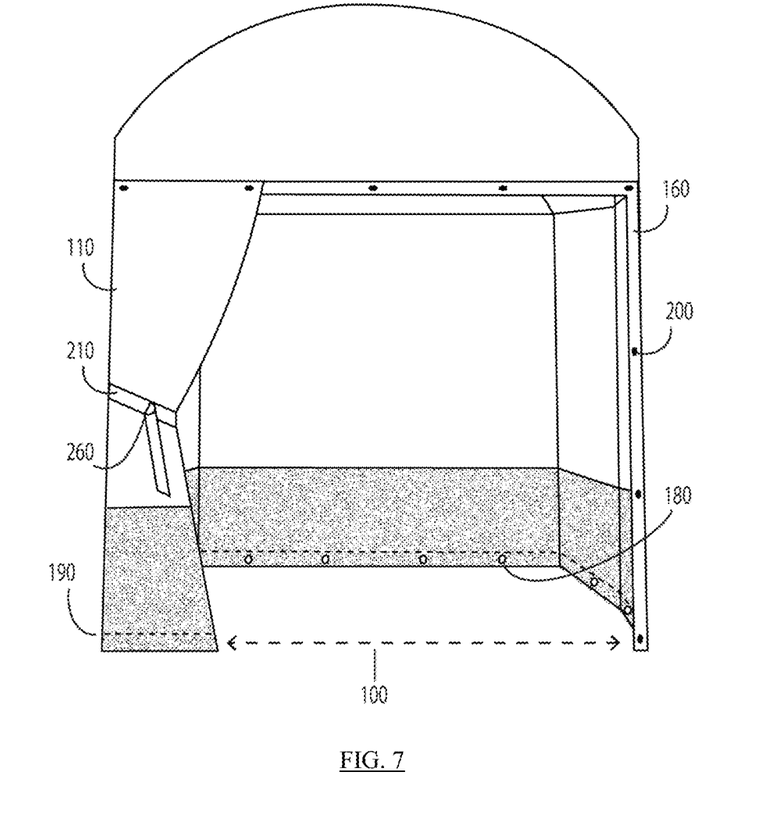

Follow these steps to attach the front panel 110 to the apiary enclosure:
1. Attach the front panel 110 over the entrance 100 and press in place at the sides and top.
2. Secure the twist-lock fasteners 200 at the sides and top.
3. To open the apiary enclosure, loosely gather the front panel 110 to either side and fasten with the tie-back strap 210, as shown in FIG. 7.

Installing Front Gates (Optional)

For additional security from predators, place a set of light-weight gates across the entrance 100 of the apiary enclosure. Home improvement stores have a variety of easy-to-install fencing and gate systems that do not require a concrete foundation. The gates can be made either of metal or wood and lined with the same wire mesh that is used to reinforce the apiary enclosure.

Positioning the Beehive

Place your first beehive on either side of the apiary enclosure, leaving room for a second hive on the other side. Bees "lock in" their location and the hive cannot be easily moved once established. The side of the hive with the landing board should be toward the back wall of the apiary enclosure. The front of the hive with the inspection drawer can be close to the front panel 110. Allow enough room between the hive and the apiary enclosure walls to remove weeds and debris with a hoe or small rake.

Configuring the Flight Portal

The flight portal 130 directs bees to fly overhead and can be configured to left, right, or center. Bees naturally fly up and out through the flight portal 130 and quickly learn to return the same way. While the bees are learning to navigate through the flight portal 130, fold down a corner of the front panel 110 to provide an alternate route.

Providing a Water Source

A half whiskey barrel pond with a solar pump, couple of plants, a few mosquito fish, and some nutritious algae makes a good water source for a colony of bees. To keep your outdoor living space clear of bees, place their water source where the bees will not cross your path as they haul water back to the hive. Because bees from other hives might discover the water source, it is best to place it a moderate distance from the apiary.

Installing a Package of Bees

As a convenience, set up a folding table in front of the apiary enclosure to use as a workspace when you are installing bees or inspecting the hive. (A four-foot aluminum camping table is good solution.)

Follow these steps to install a package of bees inside the apiary enclosure:
1. Suit up and have your tools and smoker ready.
2. Open the half of the front panel 110 that is farthest from the hive. This will leave the hive enclosed on three sides, and you will be able to come and go as needed.

Important: Do not let your smoker come in contact with the apiary enclosure at any time. Because of the limited space inside the apiary enclosure, keep the smoker outside and a few feet away after you smoke the bees. As a safety measure, consider keeping your smoker in a coal hod (which is like an oblong bucket with a handle) to make it easy to carry and to prevent it from coming into contact with anything that will burn or melt.

Figure 1:
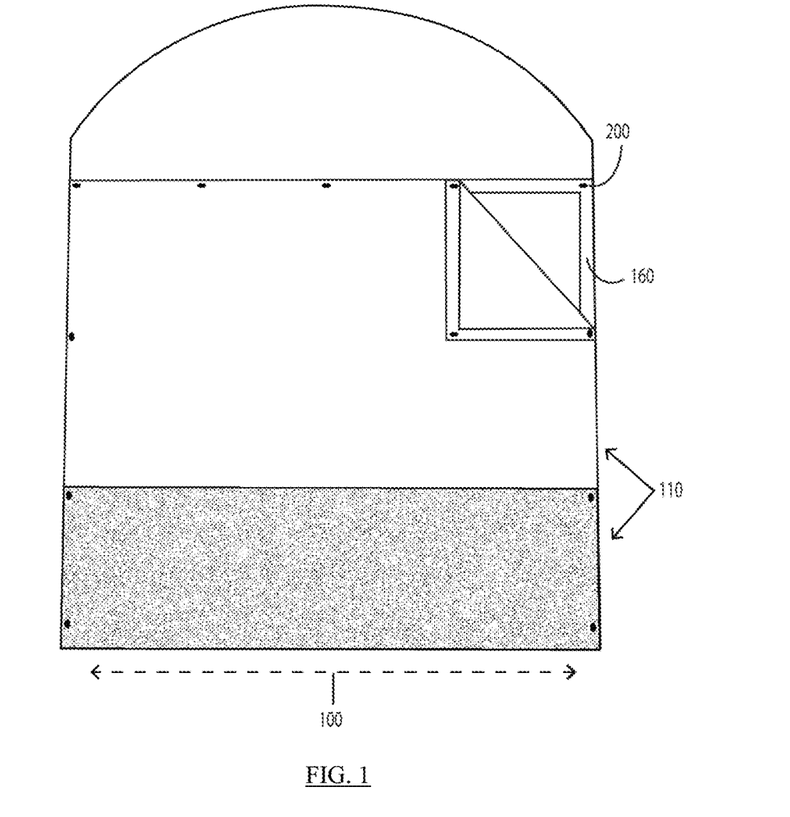
Figure 2:
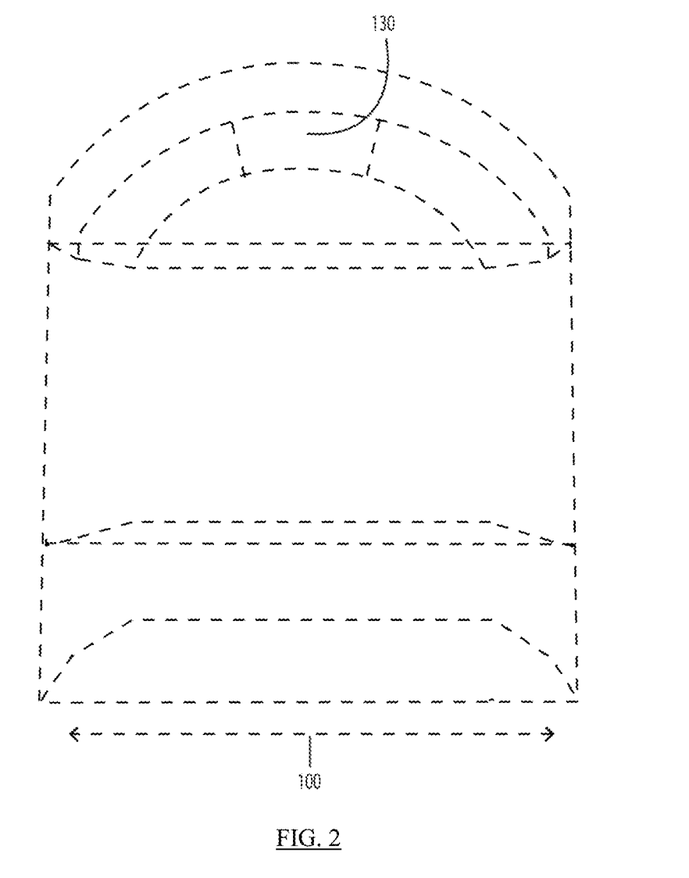

If your bees escaped the crate during transit and are loose inside a bag or box, do the following:
1. Take the bees into the apiary enclosure with the tools you need, and seal the front panel 110 shut behind you. The bees can fly freely inside the apiary enclosure as you complete the installation.
   Note: In such a situation, it might be better to use a little sugar water spray to calm the bees, rather than a smoker.
2. Whenever you leave the apiary enclosure, close the front panel 110 behind you.
3. If some bees escape into your yard, wait until the bees inside the apiary enclosure calm down. Then, open half of the front panel 110 closest to the hive. The bees will follow the scent and find their way in.
4. When the bees are settled inside the apiary enclosure, close and seal the front panel 110. Then, fold down a quarter section of the upper-corner closest to the hive.
5. Over the next few days, gradually reduce the size of the corner opening until only a small portion of the front panel 110 is folded down, as shown in FIG. 1.
6. After the bees learn to enter and exit through the flight portal 130, you can keep the front panel 110 closed.

Fabricator Use Case

The materials and techniques used to create an apiary enclosure are designed to withstand tension and exposure to the elements.

Equipment

The following equipment is needed to cut and assemble the apiary enclosure:
- A heavy-duty walking-foot sewing machine that can produce both a straight stitch and four-point zigzag stitch, or comparable heavy-duty stitch. (The four-point zigzag stitch is traditionally used in sail making.)
- Hot cutter
- Snap/grommet tool
- Large heat-resistant cutting surface (a silicone sheet works well)
- Pattern-making material Fabric All fabric used for the apiary enclosure is UV-resistant and recyclable.

Top and Upper Walls

The top and upper walls 320 of the apiary enclosure are made of agricultural netting 220 that exposes bees to diffused sunlight. Such fabric is typically 12 feet wide and is available by the roll or linear foot. The upper walls 320, top, and optional observation windows flaps 370 for five apiary enclosures can be cut from a 65-foot length of fabric.

Lower Walls

The lower walls 330 of the apiary enclosure are made of heavy, breathable fabric such as 90% UV-resistant shade cloth 230. Such fabric is typically 12 feet wide and is available by the roll or linear foot. The lower walls 330 for five apiary enclosures can be cut from a 50-foot length of fabric.

Observation Windows

The observation windows 360 are made of marine-grade 20-30 gauge clear vinyl 240. This material is typically 54 inches wide and is sold by the yard. Observation windows for five apiary enclosures can be cut from 2¼ yards of vinyl.

Notions

All notions, including thread, hook and loop 160, and fasteners are designed for long-term outdoor use and with military specifications, if available. The following notions are required to make one apiary enclosure:

- 1 8-ounce spool of UV-resistant thread and pre-wound bobbins, if available.
- 6 yards of 2-inch wide military-grade sew-on hook and loop 160, or comparable (for front panel 110)
- 3 yards of 1-inch wide military-grade sew-on hook and loop 160, or comparable (for flight portal 130)
- (Optional) 3 yards of 1-inch wide military-grade sew-on hook and loop 160, or comparable (for observation windows 360)
- 1 yard of ½-inch double-sided hook and loop, or comparable, for anchor straps 120
- 2 yards of 1-inch webbing for tie-back straps 210
- ¾ yard of boning 250 to reinforce upper corners of front panel 110
- 1-inch adjustable webbing slider 260
- 11 twist-lock fasteners 200 for front panel 110 6 snaps 270 with ¼ inch post
- 8 grommets 180 for tent stakes
- 1 roll of ¼ inch basting tape
- 1 package of ½ inch removable adhesive dots Pattern The following process can be used to create a form-fitting pattern for any supporting frame.

Pattern Supplies

The following supplies can be used to make a form-fitting pattern:

- Heavy disposable paper drop cloth
- Masking tape
- Felt pen
- Pattern-making material Pattern Making Instructions Follow these steps to create a form-fitting pattern:

1. Measure each section of the frame and cut pattern pieces of the approximate size out of a heavy disposable paper drop cloth.
2. Tape each pattern on the frame and trace each section at the midline along the supporting beams with a felt pen.
3. Redraw each pattern piece and add a ½-inch seam allowance. To create a permanent pattern, recut each pattern piece out of pattern-making material.
4. Label each piece and transfer markings.

Top Pattern

The following pattern pieces are used for the top of the apiary enclosure:

- Back Top Panel 280 (cut 1 on fold)
- Back Arch 290 (cut 1 on fold)
- Front Top Panel 300 (cut 1 on fold)
- Flight Portal Cover 150 (cut 1)
- Front Arch 310 (cut 1 on fold)

Wall Pattern

The following pattern pieces are used for the walls of the apiary enclosure:

- Upper Wall 320 (cut 1 on fold)
- Lower Wall 330 (cut 1 on fold)

Front Panel Pattern

The following pattern pieces are used for the front panel 110 of the apiary enclosure:

- Upper Front Panel 340 (cut 1 on fold)
- Lower Front Panel 350 (cut 1 on fold)

Observation Windows

The following pattern pieces are used for the observation windows described in Embodiment 3:

- Observation Window 360 (cut 2 of clear vinyl 240)
- Window Flap 370 (cut 2 of netting 220)

Assembly Instructions

Step 1: Lay Out and Cut Pattern

Follow these steps to lay out and cut the pattern pieces for the apiary enclosure.

Figure 8:
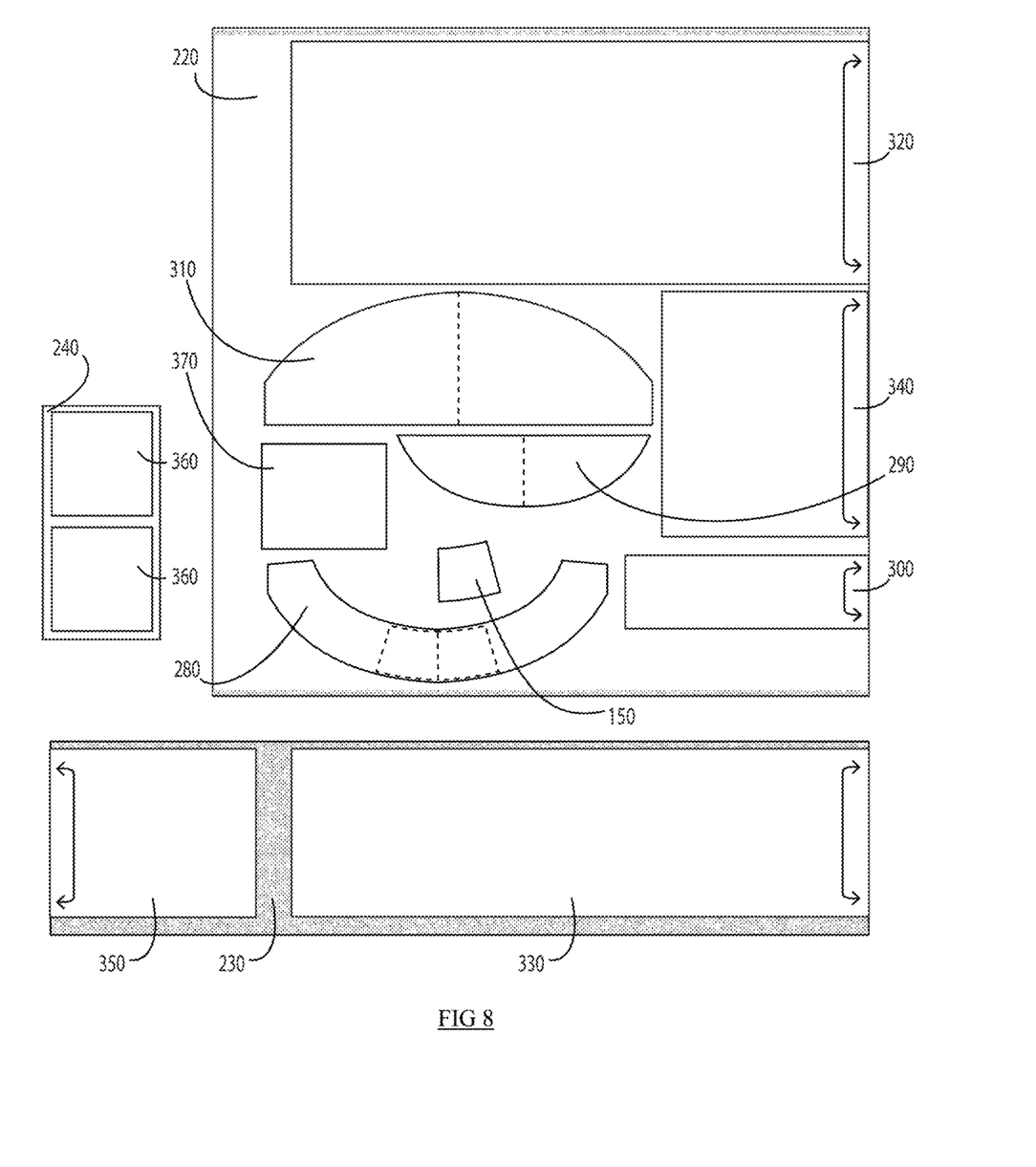

1. Lay out the pattern pieces as shown in FIG. 8:
2. Use a hot knife with cutting foot to cut each pattern piece.
   Top, upper wall 320, upper front panel 340 and window flaps 370 if used, of agricultural netting 220.
   Lower wall 330 and lower front panel 350 of heavy shade cloth 230.
   Observation windows 360 if used, of clear vinyl 240.

Step 2: Assemble Top

Figure 9:
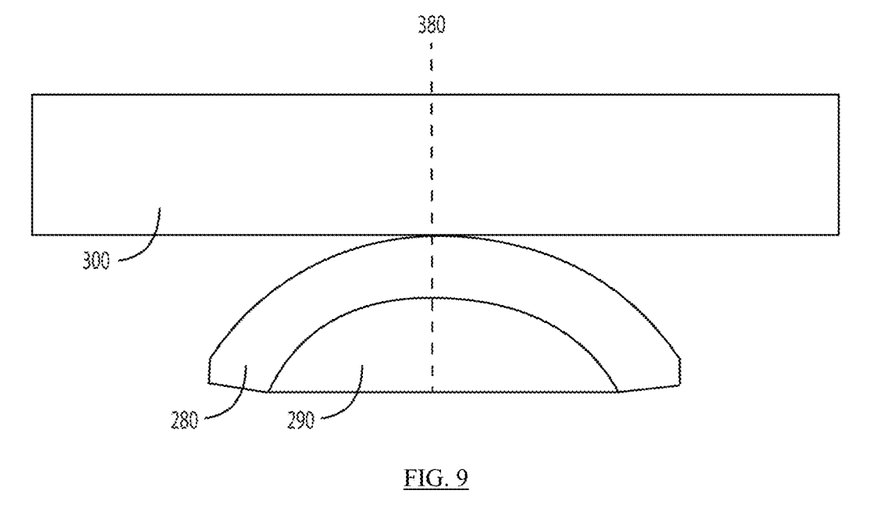
Figure 10:
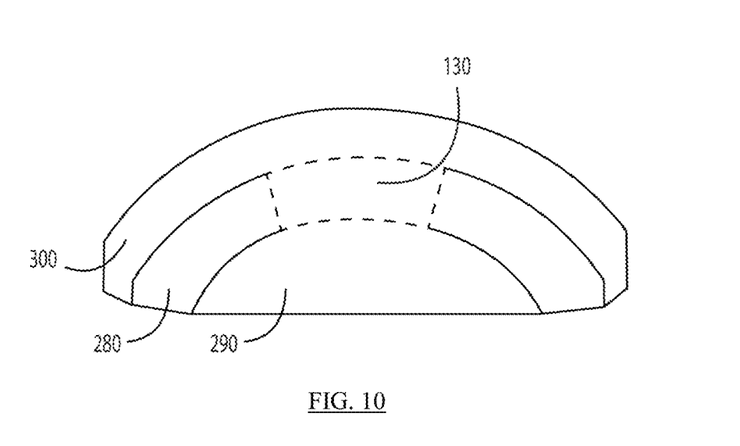

Follow these steps to assemble the top, as shown in FIGS. 9-10. All seams are overlapped and basted. Tension-bearing seams are sewn once with a four-point zig zag stitch or comparable heavy-duty stitch.

1. Mark the center of Back Top Panel 280 with an adhesive dot.
2. Fold Back Arch 290 in half and on the right side of the fabric, mark the center (top and bottom) with an adhesive dot.
3. With right sides facing up, line up the center seam of Back Top Panel 280 with the top center of Back Arch 290, with the raw edge facing the arch. Baste in place. Use a four-point zigzag stitch or comparable heavy-duty stitch to sew Back Arch 290 to Back Top Panel 280.
4. Mark the center of Front Top Panel 300 with an adhesive dot on the long edge.
5. Line up the center of Front Top Panel 300 with the center of Back Top Panel 280. Baste a ½-inch overlapped seam with the raw edge facing toward the rear. Sew with a four-point zigzag stitch or comparable heavy-duty stitch.

Step 3: Finish Flight Portal

Follow these steps to finish the flight portal 130 in the top of the enclosure, as shown in FIGS. 3-6.

1. Cut the following pieces of hook and loop 160 for the flight portal 130:
   - 18 inches (cut 2)
   - 36 inches (cut 2)
2. Peel apart and set the fuzzy strips aside. You will use them later for the flight portal cover 150.
3. On Back Top Panel 280, attach the hook and loop 160, scratchy side up, to the inside edge of the flight portal 130. (Placing the flight portal cover 150 from the inside of the apiary enclosure makes it easier to change its position if necessary.)
   a. Align each 36-inch strip of hook and loop 160 from the center along each edge of Back Top Panel 280.

Baste over the seams on each side. Sew with a straight stitch along both edges of the hook and loop 160.

b. Baste the 18-inch strips of hook and loop 160 to the right and left sides to create an enclosed rectangle with the ends of the short strips overlapping the ends of the long strips. Sew with a straight stitch along both edges of the hook and loop 160.

c. To create the flight portal 130, carefully cut away the netting 220 close to the edge of the hook and loop 160.

4. On Flight Portal Cover 150, fold under ½-inch seam allowance to the wrong side. Fold the fuzzy strips of hook and loop 160 lengthwise and baste over the edges of the flight portal cover 150 so it can be attached from either side. Use a straight stitch to sew through the flight portal cover 150 and both sides of the hook and loop 160.

5. On the inside of the top, place the finished flight portal cover 150 on either side of the flight portal 130. Then, press around the edges to attach the cover.

Step 4: Attach Front Arch

Figure 11:
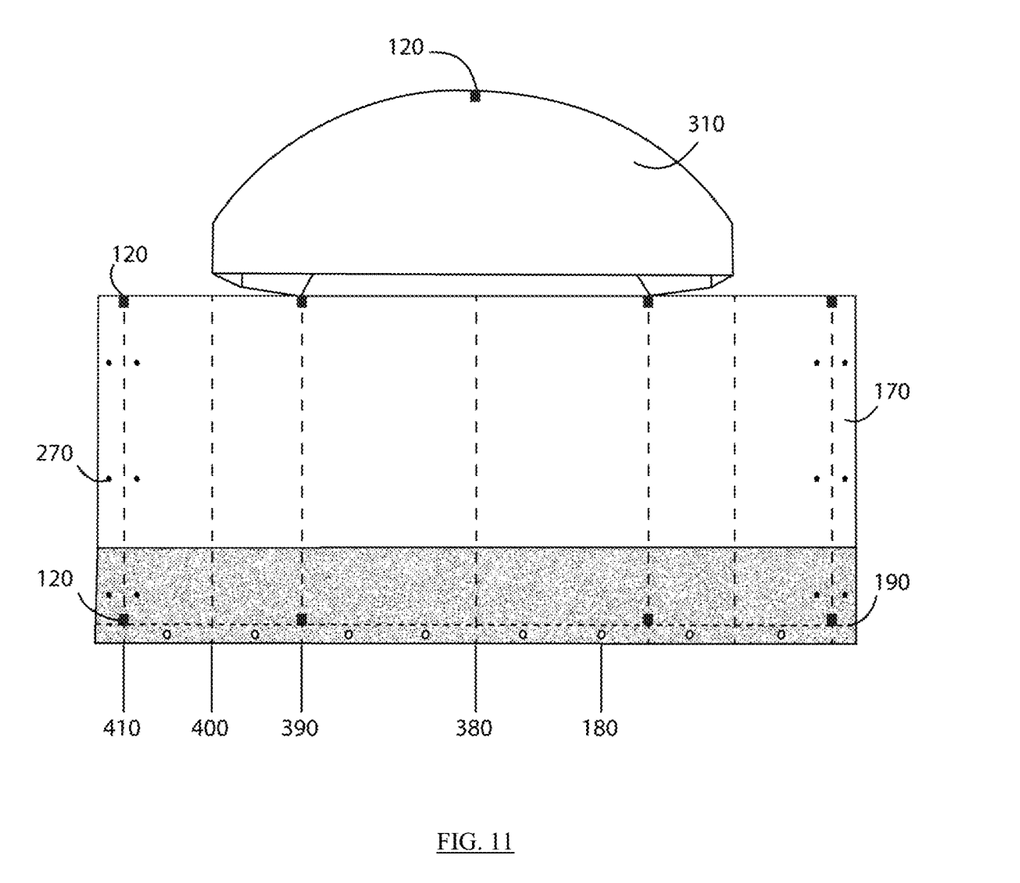

Follow these steps to attach the front arch 310 to the front top panel 300, as shown in FIG. 11.

1. Fold the bottom 1-inch edge of Front Arch 310 toward the outside to create a hem. Baste in place.
2. With right sides facing up, line up on center and baste Front Arch 310 to Front Top Panel 300 in an overlap seam with the raw edge facing toward the back. Sew with a four-point zigzag stitch or comparable heavy-duty stitch.

Step 5: Assemble Upper and Lower Walls

Follow these steps to connect the upper 320 and lower walls 330.

1. On the wrong side of Lower Wall 330, fold up a 3-inch hem 190 and baste. Sew with a straight top stitch.
2. With right sides together, baste Upper Wall 320 to Lower Wall 330. Sew with a straight stitch to make a ¾-inch seam.
3. Use a hot knife and straight edge to trim ¼ inch from the seam to seal the edges.
4. Fold down the sealed ½ inch seam and baste in place.
5. Sew with a double-straight stitch.

Step 6: Mark Reference Points

Follow these steps to mark the location of the rear, side, and front posts of the supporting frame, as shown in FIG. 11.

1. With right sides together, fold the large, assembled wall in half along the back center line 380. Mark the center back 380 at the top, middle seam, and bottom hem 190 with adhesive dots on the wrong side of the material.
2. Measuring out from the center back 380 of the wall on each side, mark the location of the rear 390, side 400, and front posts 410 of the frame at the top, middle seam, and bottom hem 190 with adhesive dots:

To mark the location of the rear posts 390, measure 30½ inches from the center back 380 to the right and left. Place an adhesive dot 1 inch from the top, at the middle seam, and at the bottom hem 190 along that line.

To mark the location of the post 400 on each side, measure 20 inches from the rear post 390 on the right and left. Place an adhesive dot 1 inch from the top, at the middle seam, and at the bottom hem 190 along that line.

To mark the location of the front post 410 on each side, measure 24 inches from the side post on the right and left. Place an adhesive dot 1 inch from the top, at the middle seam, and at the bottom hem 190 along that line.

3. Use the grommet tool to insert 8 grommets 180 1 inch above the bottom hem 190 as shown in FIG. 11.

Step 6a: Observation Windows (Optional)

See the instructions at the end of this section to add an observation window 360 on each side.

Step 7: Attach Top to Walls

Follow these steps to attach the assembled top to the walls of the apiary enclosure, as shown in FIG. 11.

1. With right sides up, line up the center bottom edge of the back arch 290 with the center top of the wall 380, with the top overlapping the wall by ½ inch.
2. Starting from the center back 380, baste the assembled top to the wall, lining up the seams with the reference marks to create an overlapped seam. Work your way to the free edge 170 on each side. Adjust the corner intersection between the top of the wall and the front arch 310 as needed. The free edge 170 of the wall extends past the front post guideline 410 on each side of the entrance 100.
3. Sew the wall to the assembled top with a double-straight top stitch.

Step 8: Attach Anchor Straps

Follow these steps to attach the anchor straps 120 to the apiary enclosure. The anchor straps 120 are used to line up and secure the enclosure at the front, top, and back as it is slipped over the frame.

1. Use the hot cutter to cut nine 3-inch pieces of double-sided hook and loop for the anchor straps 120.
2. Refer to the markings on the pattern and adhesive dots, and on the inside of the enclosure, baste the anchor straps 120 at the locations shown in FIG. 11.
3. Sew with a box-x stitch in the center of each anchor strap 120.

Step 9: Finish the Entrance

Follow these steps to finish the entrance 100.

Figure 12:
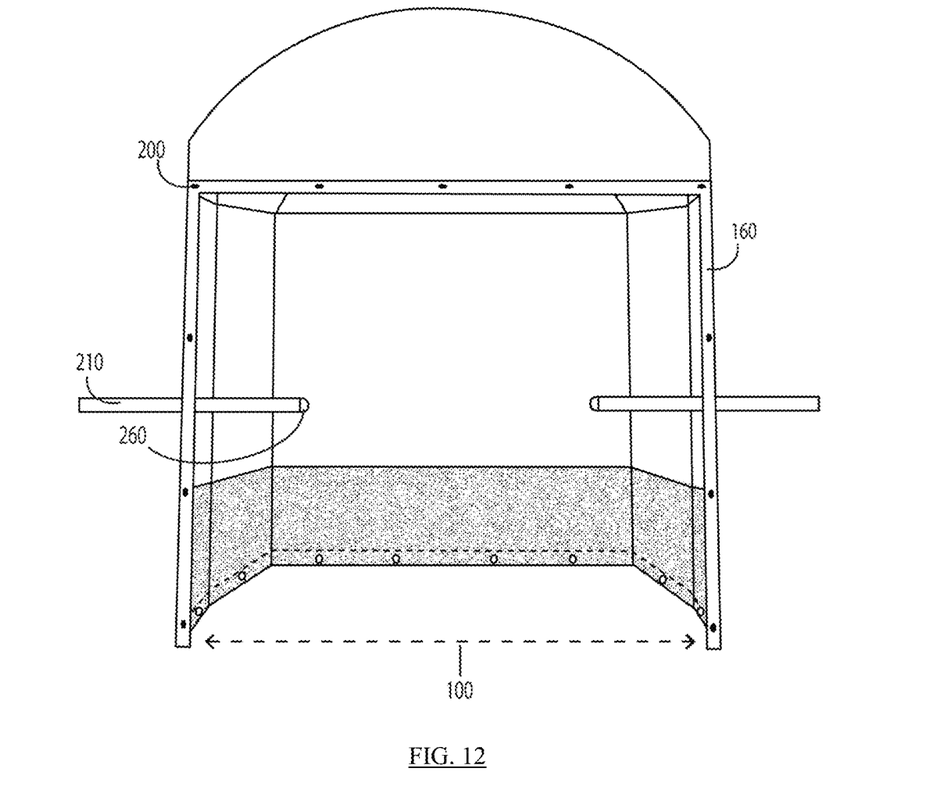

1. On each side of the entrance 100, fold back the free edge 170 and baste at the front arch 310 in each upper corner.
2. Cut two 3-foot pieces of 1-inch webbing with the hot cutter to seal the ends.
3. Attach a webbing slider 260 to one end of each tie-back strap 210 and sew with a box-x stitch.
4. Refer to FIG. 12 and on the front post guideline 410, center each tie-back strap 210 horizontally halfway up the entrance 100, with the webbing slider 260 toward the entrance. Baste and sew with a box-x stitch.
5. Cut two strips of hook and loop 160 the height of the entrance 100, plus 1 inch. Baste the scratchy side of the hook and loop 160 along the front post guideline 410 on both sides of the entrance 100, starting at the hem 190, over the tie-back straps 210, and extending 1 inch past the lower edge of Front Arch 310. Sew along both edges with a straight stitch.
6. Cut a 6-foot 2-inch length of hook and loop 160 for the top of the entrance 100. Starting on the left side, ½-inch above the lower edge of Front Arch 310, baste the scratchy side of the hook and loop 160 across the top of the entrance 100, overlapping the vertical strips on each side. Sew along all four edges with a straight stitch across the top, pivoting at each corner of the strip.
7. On each side of the entrance 100, install three snaps 270 to secure the free edge 170 that wraps around the front post, as shown in FIG. 11.

Step 10: Finish Front Panel

Figure 13:
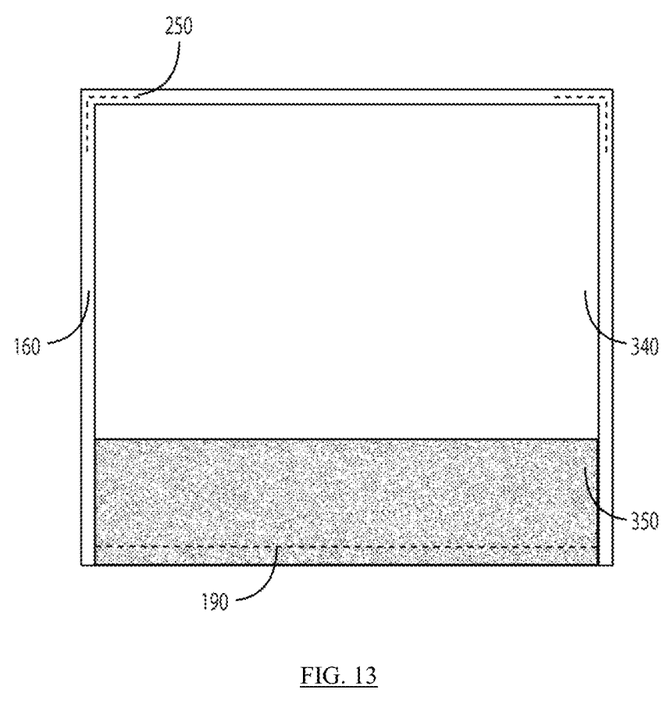
Figure 14:
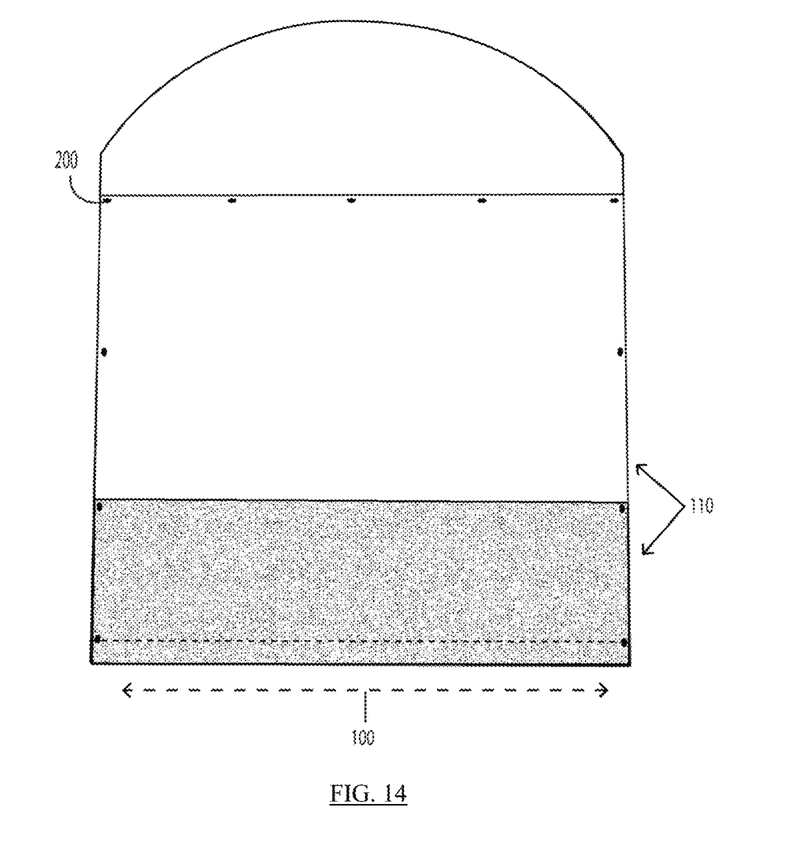

Referring to FIG. 13, follow these steps to finish the front panel 110.
1. On the wrong side of Lower Front Panel 350, fold up a 3-inch hem 190 and baste. Sew with a straight top stitch.
2. With right sides together, baste Upper Front Panel 340 to Lower Front Panel 350. Sew with a straight stitch to make a ¾-inch seam.
3. Use a hot knife and straight edge to trim ¼ inch from edge of seam and seal the edges.
4. Fold down the seam and baste in place.
5. Sew with a double-straight top stitch.
6. Along the side edges, fold ½ inch to the inside and baste. Then, fold down ½ inch across the top and baste.
7. To prevent the corners from curling, do the following:
   a. Cut four 10-inch pieces of boning 250. Cut the top of each at a 45-degree angle to create a mitered corner.
   b. On the wrong side of the front panel 110, baste the boning 250 to each upper-corner, ½ inch from the fold.
8. On the wrong side of the front panel 110, baste the fuzzy strip of hook and loop 160 to each side, ¼ inch from the fold and covering the raw edge. Then, baste the remaining strip of fuzzy hook and loop 160 across the top of the front panel 110.
9. Sew with a straight stitch along both edges to attach the hook and loop 160 to the front panel 110 along both sides and across the top.
10. Place the front panel 110 over the entrance 100 and press to seal the hook and loop 160 in place.
11. Install 11 twist-lock fasteners 200 through the hook and loop 160 to attach the front panel 110 to the apiary enclosure across the top and sides of the entrance 100, as shown in FIG. 14.

Observation Windows (Embodiment 3)

The following instructions explain how to fabricate the optional observation windows 360 described in Embodiment 3.

Figure 15:
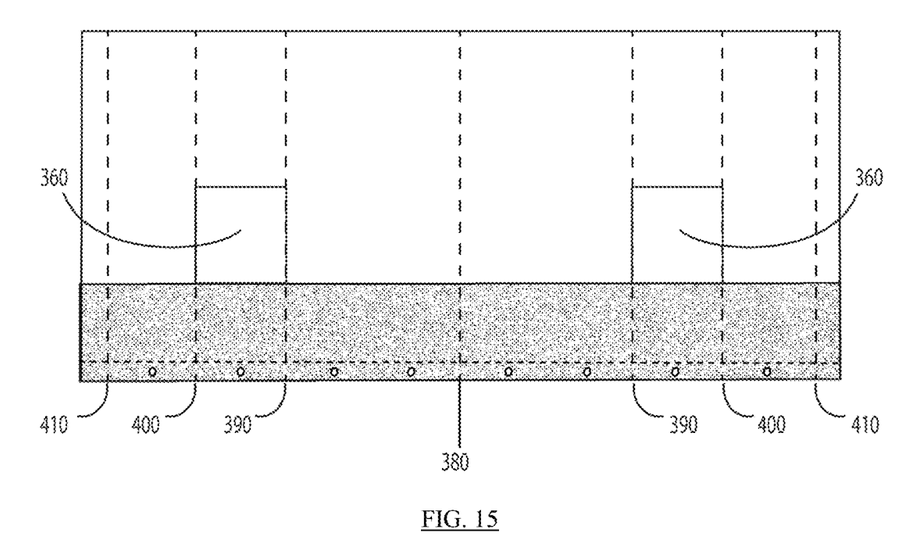

The observation windows 360 are installed before the walls are attached to the top, as shown in FIG. 15.
1. On Window Flap 370, fold under the seam allowance to the wrong side along the right and left sides, and baste. Fold down the top seam allowance on the wrong side and baste.
2. Cut three 18-inch pieces of hook and loop 160 for the sides and top edge of Window Flap 370.
3. On the wrong side of Window Flap 370, baste the fuzzy strip of hook and loop 160 over the side seam allowances, close to the edge. Then, baste the remaining fuzzy strip of hook and loop 160 over the top edge of the window flap 370.
4. Use a straight stitch to sew the hook and loop 160 along the edges of both sides and across the top of the window flap 370.
5. With right sides together on the outside of the enclosure, position the unfinished edge of Window Flap 370 ⅝ inch above the wall seam. Baste the unfinished edge of the window flap 370 to the enclosure between the adhesive dots on the wall. Sew with a straight stitch.
6. On the inside of the enclosure, baste the observation windows 360 to each side above the lower wall 330 seam and between the adhesive dots.
7. On the outside of the enclosure, baste the scratchy side of the hook and loop 160 along both sides and across the top of each observation window 360.
8. Before sewing, make sure that it aligns correctly with the fuzzy hook and loop 160 when the window flap 370 is closed. Then, use a straight stitch to sew the hook and loop 160 along the sides and across the top of each observation window 360.
9. Close the window flap 370 over each observation window 360 and secure on the sides and top with the hoop and loop 160. At the lower edge of the window flap 370, sew a double line of straight top stitches at the bottom edge through the window flap 370, upper wall 320, and observation window 360.

What is claimed is:

1. A fabric apiary enclosure with a plurality of peripheral walls extending between a top component and a bottom component cooperating to define an enclosure fitted to a supporting frame; comprising the plurality of peripheral walls apportioned to define an upper section and a lower section, and further comprising a back wall, a plurality of opposing side walls, and a front panel that has a hook and loop structure that affixes the front panel to the plurality of opposing side walls and to the top component in a position that is opposite the back wall; further comprising a plurality of placement variations of the front panel that define the perimeters of a plurality of openings, wherein the front panel can be:

fully detached from either one of the opposing side walls and fully detached from the top component, or fully detached from either one of the opposing side walls and partially detached from the top component, or partially detached from either one of the opposing side walls and partially detached from the top component, or fully detached from both of the opposing side walls and fully detached from the top component; further comprising an aperture in the top component that serves as a flight portal and that is apportioned to define a right half and a left half, wherein the aperture is associated with a flight portal cover that has a hook and loop structure, and can be affixed flush to the top component and positioned to obstruct the right half of the aperture or the left half of the aperture, in order to direct the flight path of bees.

2. The enclosure of claim 1, wherein the top component, the flight portal cover, and the upper section of the peripheral walls are made of a netting fabric that requires bees to use the aperture to enter and exit the enclosure.

3. The enclosure of claim 1, wherein the top component, the flight portal cover, and the upper section of the peripheral walls are made of a mesh fabric that requires bees to use the aperture to enter and exit the enclosure.

4. The enclosure of claim 1, wherein the lower section of the peripheral walls is made of a breathable, heavy fabric in order to provide bees with a sense of security and thereby reduce defensive behavior.

5. The enclosure of claim 1, further comprising a plurality of straps that are affixed to the enclosure and attach the enclosure to the supporting frame in order to prevent them from moving with respect to one another.

* * * * *